United States Patent [19]

Mehta

[11] Patent Number: 4,911,358
[45] Date of Patent: Mar. 27, 1990

[54] TEMPERATURE RECOVERY SYSTEM FOR AN ELECTRONIC PROGRAMMABLE THERMOSTAT

[75] Inventor: Vinay Mehta, Germantown, Tenn.

[73] Assignee: Hunter-Melnor, Inc., Memphis, Tenn.

[21] Appl. No.: 277,553

[22] Filed: Nov. 29, 1988

[51] Int. Cl.⁴ .............................................. F23N 5/20
[52] U.S. Cl. ................................. 236/46 R; 165/12
[58] Field of Search ..................... 236/46 R; 165/12

[56] References Cited

U.S. PATENT DOCUMENTS

| | | | |
|---|---|---|---|
| 4,071,745 | 1/1978 | Hall | 236/46 R X |
| 4,172,555 | 10/1979 | Levine | 236/46 R |
| 4,200,910 | 4/1980 | Hall | 236/46 R |
| 4,265,298 | 5/1981 | Sumner, Jr. et al. | 165/12 X |
| 4,265,299 | 5/1981 | Harnish | 165/12 |
| 4,266,599 | 5/1981 | Saunders et al. | 165/12 X |
| 4,319,711 | 3/1982 | Barker et al. | 236/46 R |
| 4,338,791 | 7/1982 | Stamp, Jr. et al. | 165/29 |
| 4,387,763 | 6/1983 | Benton | 165/29 |
| 4,442,972 | 4/1984 | Sahay et al. | 165/12 X |
| 4,771,392 | 9/1988 | Hall | 236/46 R |

Primary Examiner—William E. Wayner
Attorney, Agent, or Firm—Heiskell, Donelson, Bearman, Adams, Williams & Kirsch

[57] ABSTRACT

A method of controlling a multistage heating system so as to minimize the energy required to bring the temperature of a predetermined volume of space to a predetermined temperature level is provided. The multistage heating system includes an energy efficient first heating mechanism and at least a less energy efficient second heating mechanism. First, a time period for the multistage heating system to bring the temperature of the predetermined volume of space to the predetermined temperature level is calculated. This calculated time period is provided into a plurality of zones, each of the plurality of zones having an associated temperature limit. The first and second heating mechanism are controlled in each of the plurality of zones according to a switching logic associated with each respective zone such that the temperature within each zone does not exceed the associated temperature limit.

11 Claims, 12 Drawing Sheets

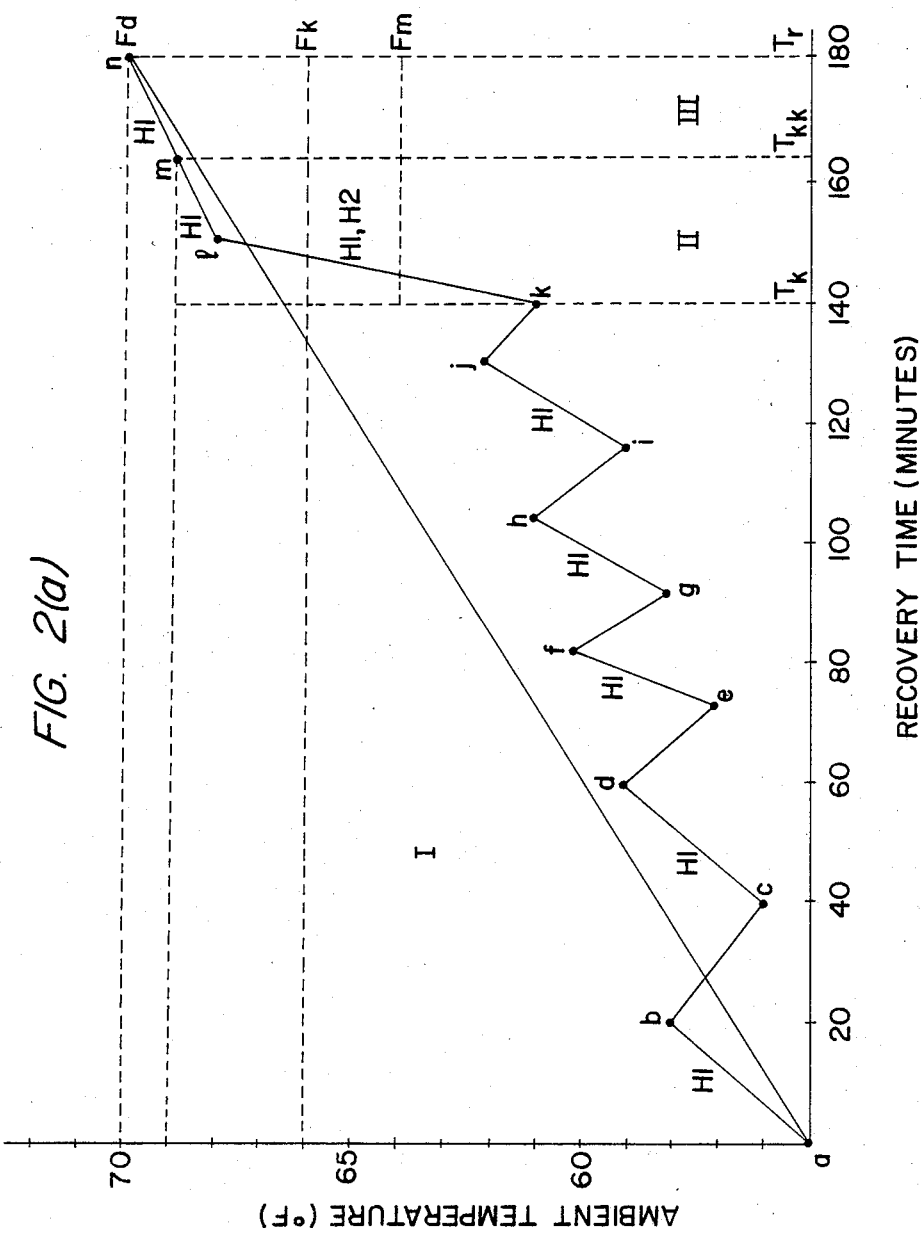

AB - SAMPLING CYCLE COMPRESSOR ONLY
BC - COMPRESSOR + AUX HEAT
CD - DECAY OR COMPRESSOR ONLY
DE - COMPRESSOR + AUX HEAT
EF - DECAY OR COMPRESSOR ONLY
FG - COMPRESSOR + AUX HEAT

| | | |
|---|---|---|
| A-B | COMPRESSOR ONLY HEAT | PERIOD # 1 |
| H | IS DESIRED TEMP. | |
| B-C | COMPRESSOR + AUX HEAT | PERIOD # 2 |
| C-D | COMPRESSOR HEAT | PERIOD # 3 |
| D-E | COMPRESSOR + AUX HEAT | PERIOD # 4 |
| E-F | COMPRESSOR HEAT | PERIOD # 5 |
| F-G | COMPRESSOR + AUX HEAT | PERIOD # 6 |
| G | IS THE RECOVERY REACHED MUCH EARLIER | |
| ① TO ⑥ | ARE PRE-DETERMINED PERIODS | |

A-B, C-D, E-F, G-H, I-J  -  COMPRESSOR OR DECAY
B-C, D-E, F-G, H-I       -  COMPRESSOR & AUX HEAT

TEMPERATURE RECOVERY SYSTEM FOR AN ELECTRONIC PROGRAMMABLE THERMOSTAT

BACKGROUND OF THE INVENTION

The present invention generally relates to programmable thermostats and, more particularly, to a temperature recovery system for an electronic programmable thermostat.

Attempts to develop improved heating and cooling systems generally focus on improved efficiency coupled with reduced costs. One technique which attempts to embody these concepts is temperature setback and recovery. Generally, setback refers to the concept of lowering the setpoint temperature of a thermostat during night-time periods or periods when the region or space controlled by the thermostat is unoccupied in order to reduce the energy required to heat the controlled region. A related concept called set-up refers to the raising of the setpoint temperature of a thermostat during periods of non-occupancy of the controlled region or space in order to reduce the energy required to cool the region. Finally, recovery refers to the concept of activating a heating or cooling system so as to raise (or lower) the ambient temperature of the controlled region or space by the end of the set-back (set-up) period to some predetermined temperature.

Studies conducted by the Department of Energy estimate that setting a thermostat back 10° F. for two eight-hour periods during winter can reduce a user's energy costs by as much as 35%. Setting a thermostat up 5° F. for two eight-hour periods during summer can reduce a user's energy costs up to 25%. However, an inefficient recovery system or the programming of too large a set-back or set-up temperature range can utilize as much or more energy than is saved by raising or lowering the temperature. This is especially true, for example, in multi-stage air conditioning systems which include heating systems employing both an energy efficient heating mechanism such as a heat pump and a less energy efficient auxiliary heating mechanism such as an electrical resistance-type heater. Excess use of the auxiliary heating mechanism can substanially increase energy costs. A similar situation also arises in muli-stage cooling systems.

As an example, a thermostat may be programmed to raise the ambient temperature of the controlled region from a set-back temperature of 60° F. to a programmed temperature of 68° F. by 6:00 A.M. In a thermostat having a built-in recovery system, the heating system will switch on at some time prior to 6:00 A.M. so that at 6:00 A.M., the ambient temperature will be 68° F. In multi-stage heating systems, as noted above, this recovery time is very important. If the heating system is inefficiently operated during this period, excessive auxiliary heat may be utilized and no energy savings will result.

SUMMARY OF THE INVENTION

Accordingly, it is an object of the present invention to provide a recovery system which utilizes minimum energy to reach the desired temperture at the end of the recovery period.

It is another object of the present invention to provide a recovery system which minimizes the use of auxiliary heat during the recovery period.

In accordance with the present invention, a method of controlling a multistage heating system so as to minimize the energy required to bring the temperature of a predetermined volume of space to a predetermined temperature level is provided. The multistage heating system includes an energy efficient first heating mechanism and at least a less energy efficient second heating mechanism. First, a time period for the multistage heating system to bring the temperature of the predetermined volume of space to the predetermined temperature level is calculated. This calculated time period is divided into a plurality of zones, each of the plurality of zones having an associated temperature limit. The first and second heating mechanisms are controlled in each of the plurality of zones according to a switching logic associated with each respective zone such that the temperature within each zone does not exceed the associated temperature limit.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

It is noted that the present invention is described below in terms of a heating system. It is emphasized that the present invention is readily adapted to cooling systems. The present invention is generally applicable to air conditioning systems, where air conditioning system refers to both heating and cooling systems.

Briefly, one embodiment of the present invention consists of calculating a recvoery time period according to a predetermined empirical formula and dividing the calculated recovery time period into a plurality of recovery zones. The switching sequence of a multi-stage heating system within each recovery zone is such that minimum auxiliary heat is used to reach a desired temparature in a desired time within or at the end of a respective zone. It should be noted that while the embodiment describe below relates to a multi-stage heating system, the recovery technique of the present invention is not limited in this respect. The present invention may be applied to multi-stage heating and cooling systems or single stage heating and cooling system. In the single systems, the program steps involving additional stages will be ignored. In order to prevent excessive temperature rise within a given zone, each zone has an associated temparature limit above which the ambient temperature cannot rise. Additionally, each zone may have subzones nested therein. These subzones permit more precise control of the ambient temperture during recovery. The above-described method of dividing the recovery time period into a plurality of recovery zones and subzones and developing a switching logic or sequence for a heating system within each zone does not necessarily result in a fixed, pre-calculated short recovery ramp. The ramp within each recovery zone of the present invention may have irregular features but it is, in fact, governed by logic which results in minimum energy being used to reach the desired temperature at the end of the recovery period.

One embodiment of the temperature recovery switching logic of the present invention will be explained with reference to FIGS. 1a, 1b, and 1c.

The recovery time period is calculated in minutes utilizing a generalized formula:

$$T_R = AF^2 + BF + C$$

$T_R$ represents the recovery time, and F is equal to $F_d - F_s$, where $F_d$ is the desired ambient temperature at the end of recovery and $F_S$ is the temperature when recovery is initiated. A, B, and C are constants derived from experimental results utilizing the heating and cooling systems in typical heating and cooling environments. Thus, these constants can be varied in accordance with the effectiveness of previous recovery operations, weather conditions, system design, etc.

Figure 1A:
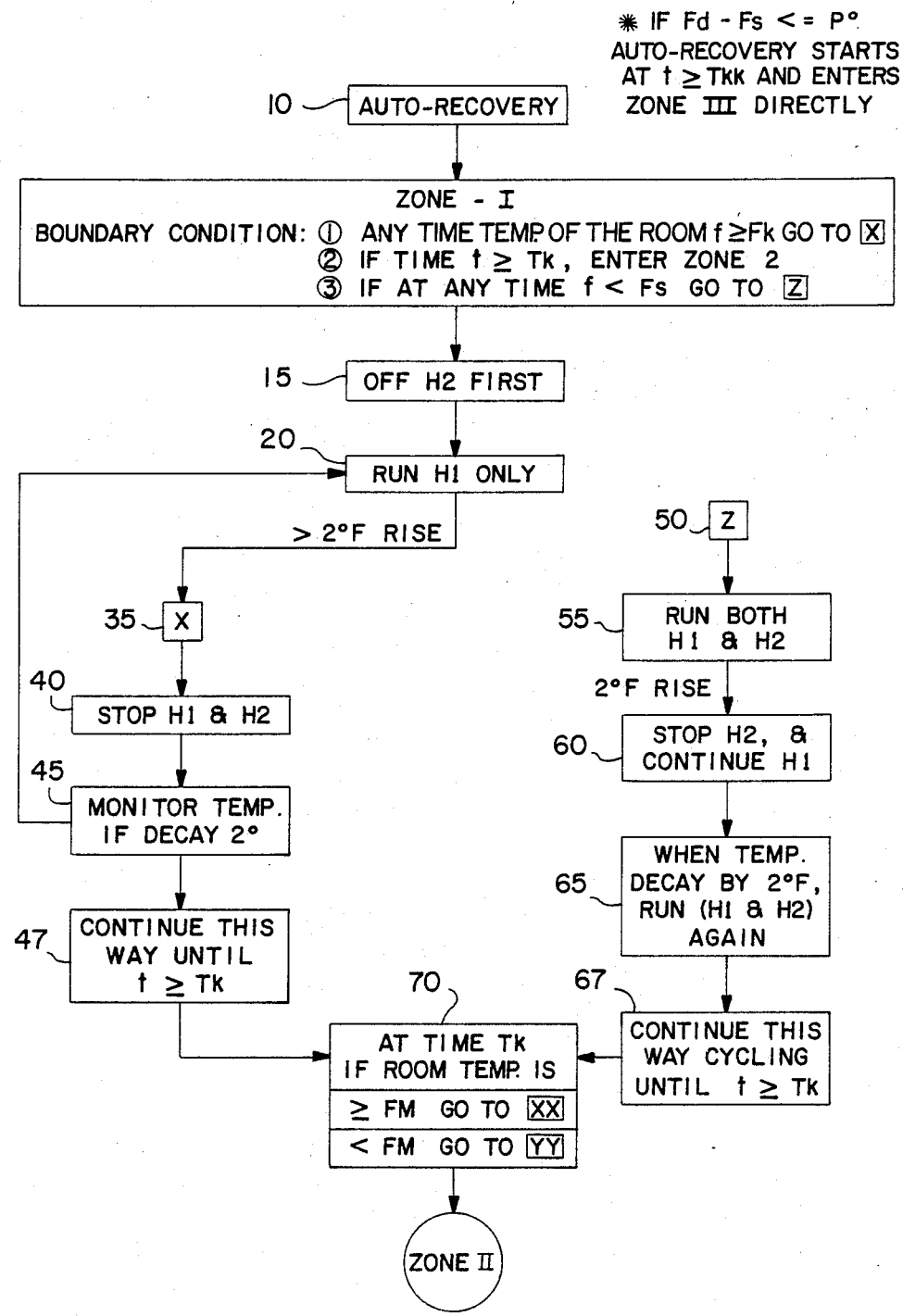
FIGS. 1(*a*), 1(*b*), and 1(*c*) are flow charts illustrating recovery according to the present invention.
Figure 1B:
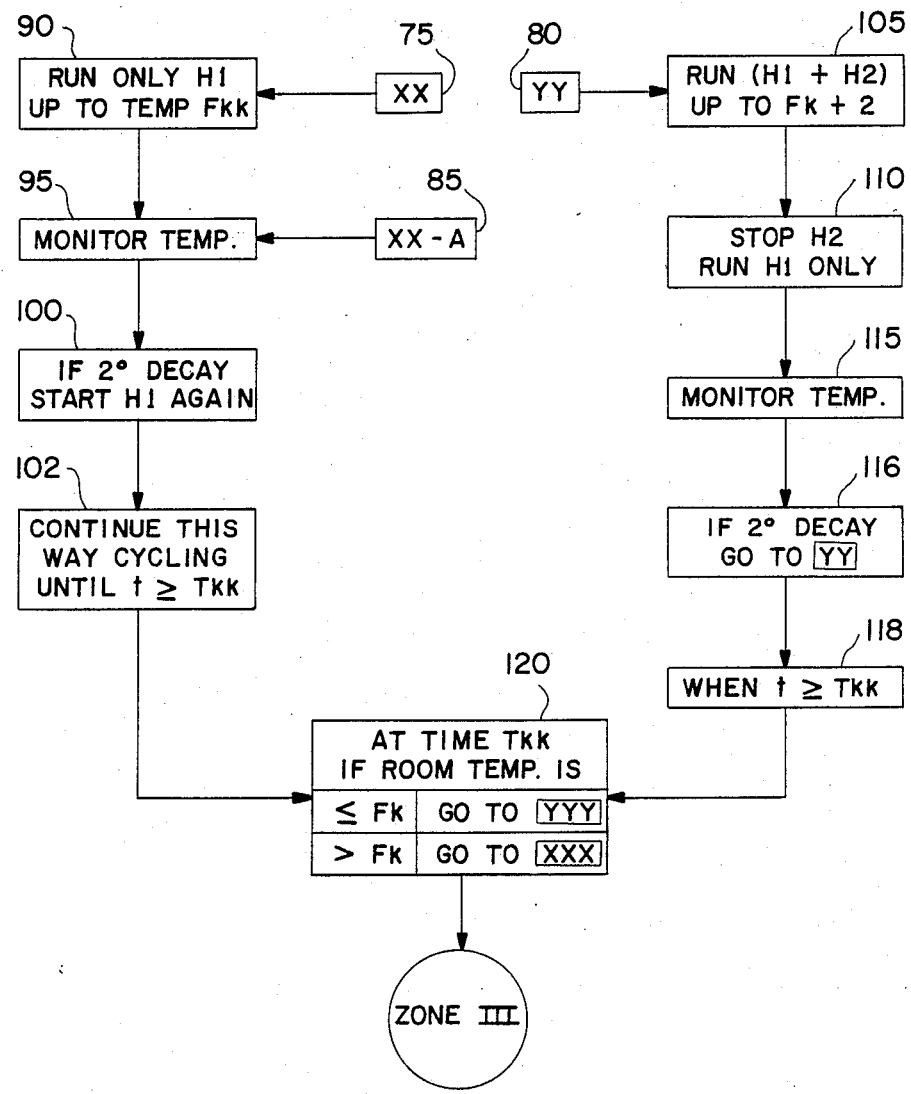
Figure 1C:
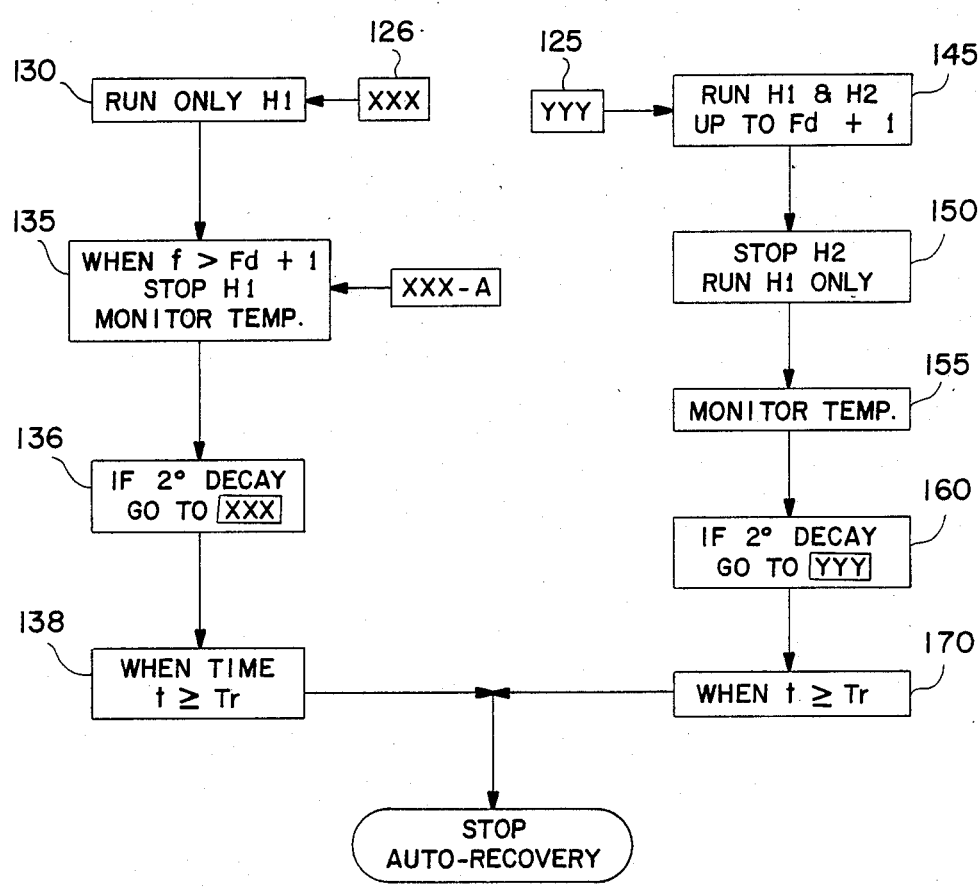

Table 1 sets forth the various parameters which will be used in the discussion of FIGs. 1a, 1b, and 1c.

TABLE 1

| | |
|---|---|
| $F = F_d - F_s$ | $F_m = F_d - 6$ |
| $F_{kk} = F_d - 1$ | $T_{kk} = T_r - t_3$ (minutes) |
| $F_k = F_d - 4$ | $T_k = T_r - (t_2 + t_3)$ (minutes) |
| | $T_r = t_1 + t_2 + t_3$ |
| | $F_d$ = Desired Temperature of controlled region at end of recovery |
| $F_s$ = Temperature of controlled region when recovery started | $T_s$ = Time when recovery started |
| H1 = Compressor Heat | H2 = Auxiliary Heat |
| $T_r$ = Recovery time | $t_1$ = predetermined time period of zone 1 |
| $t_2$ = predetermined time period of zone 2 | $t_3$ = predetermined time period of zone |

If it is determined that temperature recovery should be initiated (discussed in detail below), the recovery time period calculated in accordance with the above formula is divided into a plurality of switching zones. Temperature recovery will be referred to as "auto-recovery" in the discussion which follows since th recovery process is automatically initiated and controlled by a thermostat microprocessor, as described in detail below. In the present example, the recovery peroid is devided into three zones having associated time intervals of $t_1$, $t_2$ and $t_3$ respectively, as defined below. Switching zone I extends from the time recovery is initiated until $(t_2+t_3)$ minutes prior to the end of the setback period. Switching zone II extends from the end of switching zone I to $t_3$ minutes prior to the end of the set-back period, and switching zone III extends from the end of switching zone II to the end of the recovery peroid. It should be noted that use of three zones merly describes one embodiment of the present invention and that different numbers of zones or subzones nested inside the zones may be used within the scope of the present invention. The more zones and subzones which are utilized, the more precisely the recovery period may be controlled.

Auto recovery is initiated at step 10 in FIG. 1a. Several boundary conditions govern auto recovery during zone I switching. First, if at any time the ambient temperture f is greater than or equal to $F_k$, control passes to step 35 as described in detail below. Second, when time T becomes greater than or equal to $T_k$, the recovery operation passes into zone II. Finally, if at any time during zone I switching, the ambient temperature f becomes less than $F_S$, control immediately passes to step 50, which will also be described below.

If at step 10, $F_d - F_s$ is determined to be less than or equal to P°, where P is some constant, e.g. P=2, the auto recovery operation begins at time $T = T_{kk}$ and zone II switching are not initiated. If there is only a small differential between $F_s$ and $F_d$, significant energy savings are not capable of being generated during the recovery operation. If it is determined that zone I switching should be initiated, control passes to step 15 where auxiliary heat H2 is switched off, if it is on at the time recovery begins. Thus, auto recovery is designed to be initiated such that the more expensive auxiliary heat H2 is not initially operated. Control then passes to step 20 where less expensive compressor heat H1 is switched on. If and when the operation of the compressor heat generates a temperature rise greater than 2°, control passes to step 40 where compressor heat H1 is switched off. Since the ambient temperature is generally measured in units of whole degrees rather than fractions thereof, a rise greater than 2° generally refers to a 3° rise, a 4° etc., although the invention is not limited in this respect. After compressor heat H1 is switched off at step 40, control passes to step 45 where the ambient temperature is monitored. If and when a 2° decay in the ambient room temperature occurs, control returns to step 20 and compressor heat H1 is switched on again. The cycling of the compressor heat in generating a three degree ambient temperature rise followed by a two degree ambient temperature decay produces a net one degree temperature rise. As indicated at step 47, thie cycling is continued throughout zone I switching, generating additional 1° temperature increases, until $T = T_k$. It is, of ccourse, possible that after the initial 3° temperature rise, the ambient temperature will not decay by 2° and further heating will not be required during zone I.

As noted above, if at any time during zone I switching the ambient temperature f drops below the ambient temperature when auto recovery is initiated ($F_s$), control immediately passes to step 50 and both compressor heat H1 and auxiliary heat H2 are switched on at step 55. Again, since ambient temperature measurements are generally made in units of whole degrees, control passes to step 50 if and when the ambient temperature f has fallen below $F_s$ by 1°, 2°, etc. Such a situation can arise when the outside temperature drops rapidly due to changing weather conditions. When the combined operation of compressor heat and auxiliary heat produces a temperature rise greater than 2°, e.g., 3°, auxiliary heat H2 is switched off while compressor heat H1 continues to be operated as indicated at step 60. If and when the temperature decays by 2° with only compressor heat H1 switched on, the combination of auxiliary heat and compressor heat is again operated as indicated at step 65. Once initiated, such cycling continues at step 67 until time $T_k$, the end of zone I. As noted above, the ambient temperature f is not permitted to exceed $F_k$ by the zone I switching sequence logic. If at any time during zone I switching, the ambient temperature f is equal to or greater than $F_k$, control immediately passes to step 35 and compressor heat H1 and auxiliary heat H2 are switched off at step 40.

Control passes to step 70 at time $T_k$ and the auto recovery operation begins zone II switching. FIG. 1(b) is a flow chart illustrating zone II switching. The switching sequence which is followed immediately upon entry into zone II is determined by the ambient temperature f at the end of zone I switching. If the ambient temperature is greater than or equal to $F_m$, control passes to step 75. If, on the other hand, the ambient temperature of is less than $F_m$, control passes to step 80.

As in zone I switching, zone II switching is governed by certain boundary conditions. First, if at any time the ambient temperature f is greater than or equal to $F_{kk}$, control passes to step 85. Second, if at any time the ambient temperature f drops below $F_m$, control passes to step 80. Finally, when time $T=T_{kk}$, the auto recovery operation proceeds to zone III switching.

If the ambient temperature f at the end of zone I switching is such that control passes to step 75, zone II switching is initiated with only compressor heat H1 being operated. As indicated at step 90, compressor heat H1 is operated until the ambient temperature is $F_{kk}$. Control then passes to step 95 where the compressor heat is switched off and the ambient temperature is monitored. If and when the temperature decays by 2°, the operation of compressor heat H1 is re-initiated at step 100. Such cycling is continued as indicated at step 102 until time $T=T_{kk}$, i.e. until zone III switching is initiated. As previously noted, if at any time during zone II switching, the ambient temperature f drops below $F_m$, control immediately passes to step 80 and both compressor heat H1 auxiliary heat H2 are operated until the ambient temperature is raised to $F_k+2$ as indicated in block 105. When this temperature is reached, control passes to step 110 where auxiliary heat H2 is switched off while the operation of compressor heat H1 is continued. Control then passes to step 115 where the ambient room temperature is monitored. If and when the temperature decays by 2°, control returns to step 80 as indicated at step 116 and both compressor heat H1 and auxiliary heat H2 are operated. Again, once initiated such cycling is continued until time $T=T_{kk}$ as indicated at step 118.

At the end of zone II switching, zone III switching is initiated. FIG. 1(c) is a flow diagram illustrating zone III switching. The initial operating states of compressor heat H1 and auxiliary heat H2 at the beginning of zone III recovery are determined by the ambient temperature f at the end of zone II switching according to the conditions set forth in block 120. If at time $T_{kk}$, the ambient temperature f is less than or equal to $F_k$, control passes to step 125. If the ambient temperature f is greater than $F_k$, control passes to step 126. As with the previous zones, certain boundary conditions govern zone III switching. If the ambient temperature f rise above $F_d+1$, both auxiliary heat H2 and compressor heat H1 are switched off. Second, if at any time, the ambient temperature f is equal to or drops below $F_k$, control passes to step 125. Finally, when the time $T=T_r$, the auto recovery operation is terminated.

If control passes from zone II to step 126, zone III switching is initiated with only compressor heat H1 switched as shown at step 130. When compressor heat H1 raise the ambient temperature f to a temperature 1° higher than the ambient temperature desired at the end of recovery i.e., $F_d+1$, compressor heat H1 is switched off and the ambient temperature is monitored as shown in block 135. If and when the ambient temperature f decays by 2°, control returns to step 126 as indicated at step 136 and compressor heat H1 is again switched on. This cycling continues as indicated at step 138 until $T=T_r$ and the recovery operation is terminated. As indicated above, if at any time the ambient temperature f drops below $F_k$, control passes to step 125 and both compressor heat H1 and auxiliary heat H2 are switched on until the ambient temperature f is raised to 1° greater than the desired temperature at the end of recovery i.e., $F_d+1$ as shown at step 145. When this tempearture is reached, auxiliary heat H2 is switched off and compressor heat H1 remains switched on as indicated in step 150. The ambient temperature is monitored at step 155. If and when the ambient tempreature decays by 2°, control again returns to step 125 as indicated at step 160 and both the compressor heat H1 and auxiliary heat H2 are switched on. Once initiated, this cycling continues as indicated at step 170 until $T=T_r$ and auto recovery is terminated. The ambient room temperature f is never allowed to exceed $F_d+1$ by the zone III switching logic.

The logic or formula utilized to operate the different stages of a multi-stage system within each zone varies based on the recovery performance of the previous zone as a whole or within part of the zone. The recovery performance may be evaluated simply by knowing the amount of change within that zone. Based on the amount of change within that zone or at the end of that zone, the recovery characteristics or the ramp or the slope or the logic of the sequentially or randomly switched mechanism of multi-stage of heat sources may be changed for the next zone or zones.

The time peroid of each zone may be different, as in the above-described example or the recovery time $T_r$ may be equally divided into any number of zones, with a minimum of 1 zone.

FIGS. 2a, 2b, 2c, and 2d illustrate several recovery paths which may be generated utilizing the teaching of the present invention as described in detail above. In each Figure, the calculated recovery time peroid is 180 minutes and it is desired to raise the temperature from 55° to 70° by the end of the recovery period.

FIG. 2a illustrates an auto recovery operation in which a temperature rise greater than 2° is greater in zone I. Recovery is initiated at point a with only compressor heat HI switched on . At point b, the ambient temperature has been raised 3° by compressor heat H1. In accordance with the switching logic of zone I, the compesssor heat is switched off. At point c, the temperature has decayed 2° from its value at point b. Thus, at point c, compressor heat H1 is again switched on and the ambient temperture is raised by 3° at point d. This cycling is continued throughout zone I, the compressor heat H1 being switched on at points e, g, and i and switched off at f, h, and j.

Zone I switching terminates at point k. Since, at point k, the ambient temperature f is less than $F_m$, zone II switching is initiated with both compressor heat H1 and auxiliary heat H2 switched on. Both heat sources are operated until the ambient temperature is raised to $F_k+2$ at point 1. At this point, auxiliary heat H2 is switched off and compressor heat H1 is operated until the end of zone II recovery at point m. At point m, the ambient temperature is greater than $F_k$ and zone III switching is initiated with only compressor heat H1 switched on. Compressor heat H1 raises the ambient temperature to $F_d$ by point n, the end of the recovery period.

Figure 2B:
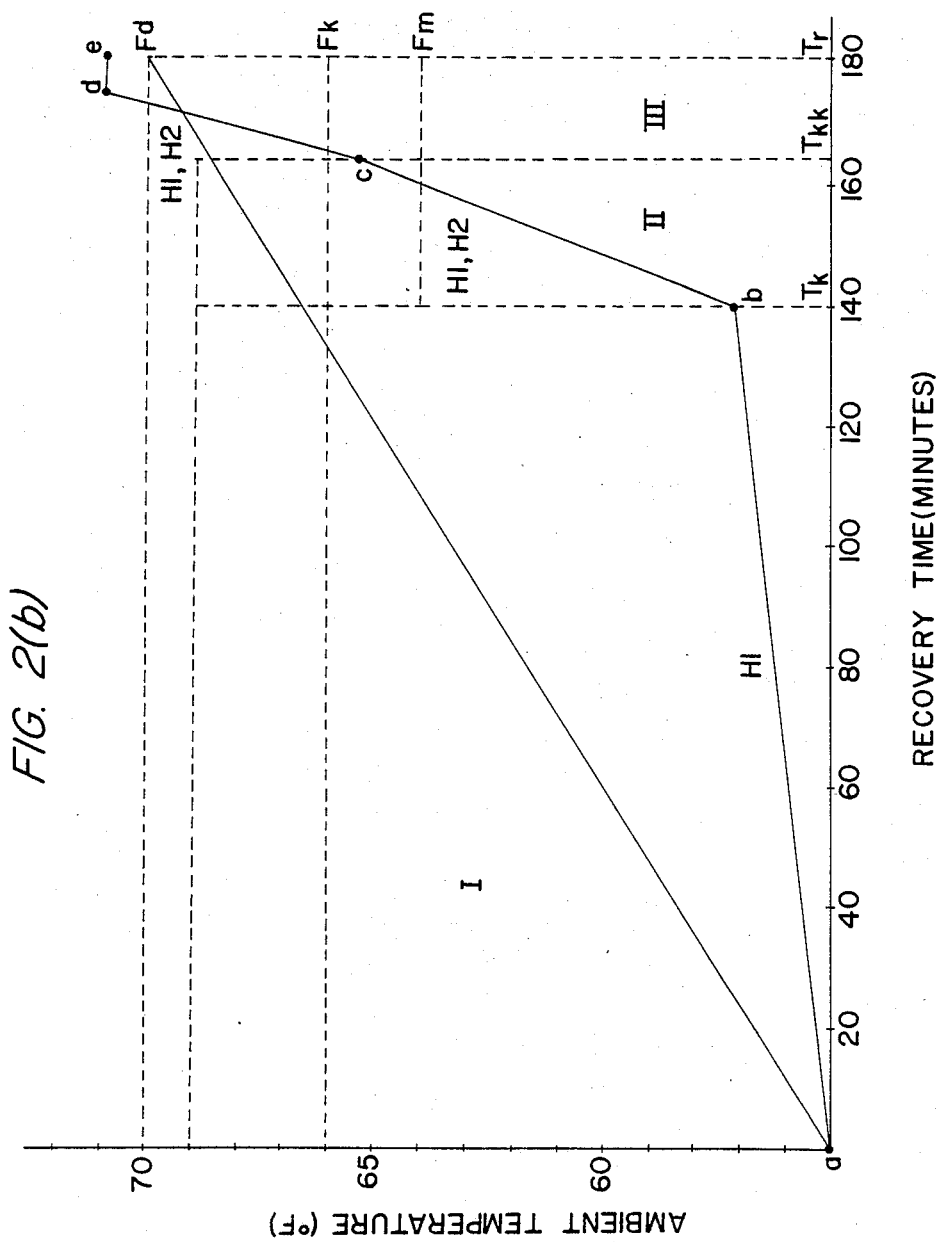
FIGS. 2 (*a*), 2(*b*), 2(*c*) and 2(*d*) graphically illustrate various recovery situations according to the present invention.

FIG. 2b illustrates an auto recovery operation in which an ambient temperature rise less than 2° but greater than 0° is generated in zone I. Recovery is initiated at point a with only compressor heat H1 switched on. Compressor heat H1 does not generate an ambient temperature rise greater than 2° in zone I. At point b, the end of zone I, zone II switching is intiated with both compressor heat H1 and auxiliary heat H2 switched on since the ambient temperature is less than $F_m$. Both compressor heat H1 and auxiliary heat H2 remain switched on during zone II recovery which is in effect until point c. At point c, zone III switching is initiated with both compressor heat H1 and auxiliary heat H2 switched on since the ambient temperature is less than $F_k$. Both heat sources are operated until point d when the ambient temperature is equal to $F_d+1$. At point d, auxiliary heat H2 is switched off while compressor heat H1 remains switched on. Auto recovery terminates at point e when time $T=T_r$. It should be noted that the ambient temperature at time $T_r$ is slightly greater than $F_d$. This means that slightly more energy was utilized during recovery than acually required. This may have been due to due to the calcuation of too long a recovery time period or unusal outdoor weather conditions. Such a situation may be overcome, for example, by providing a subzone within zone III with an associated temperature limit of $F_d-1$. This is illustrated in FIG. 2d. It can be seen that the provision of a subzone in zone III can generate a more precise auto recovery. Another technique for overcoming such a situation is to calcuation a new recovery time period by altering the constant A, B, and/or C in the eqution discussed above.

Figure 2C:
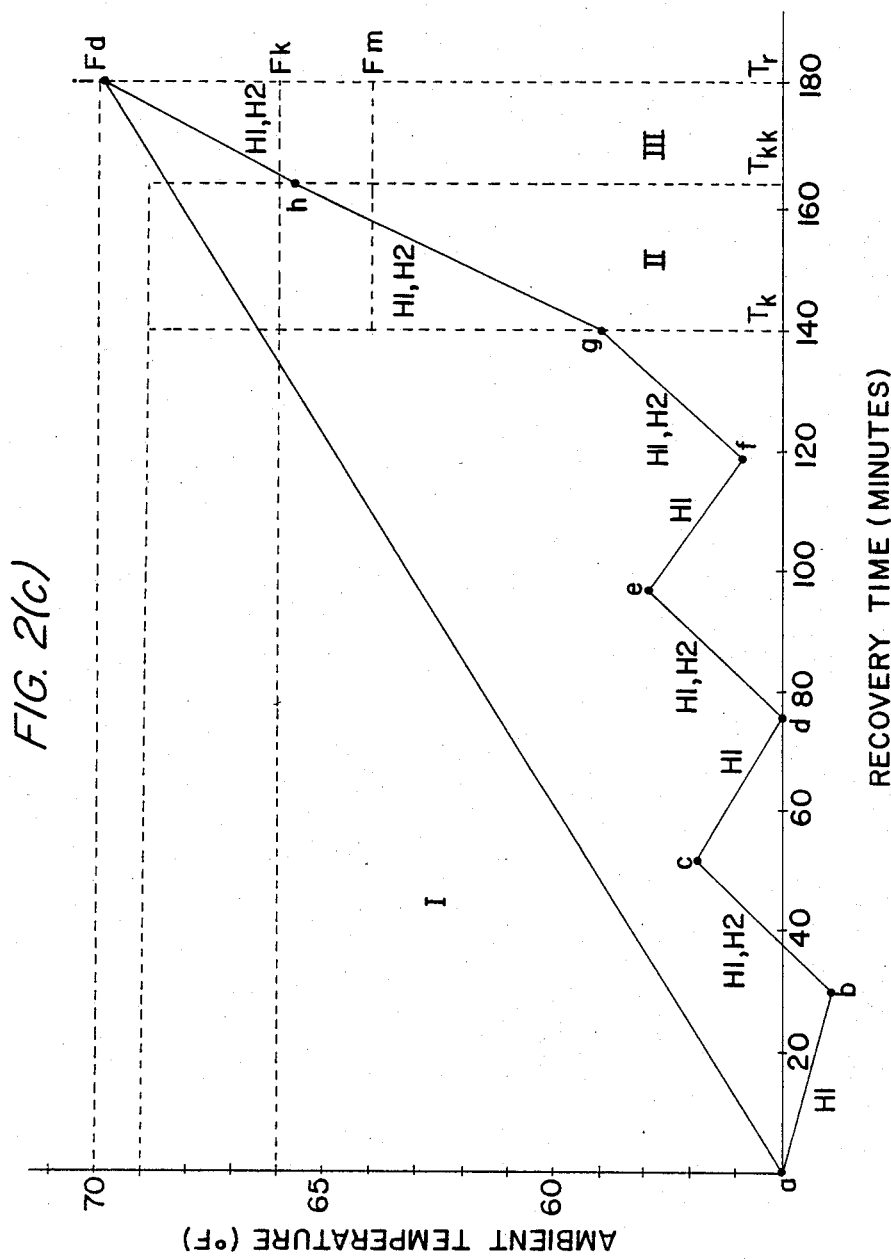
Figure 2D:
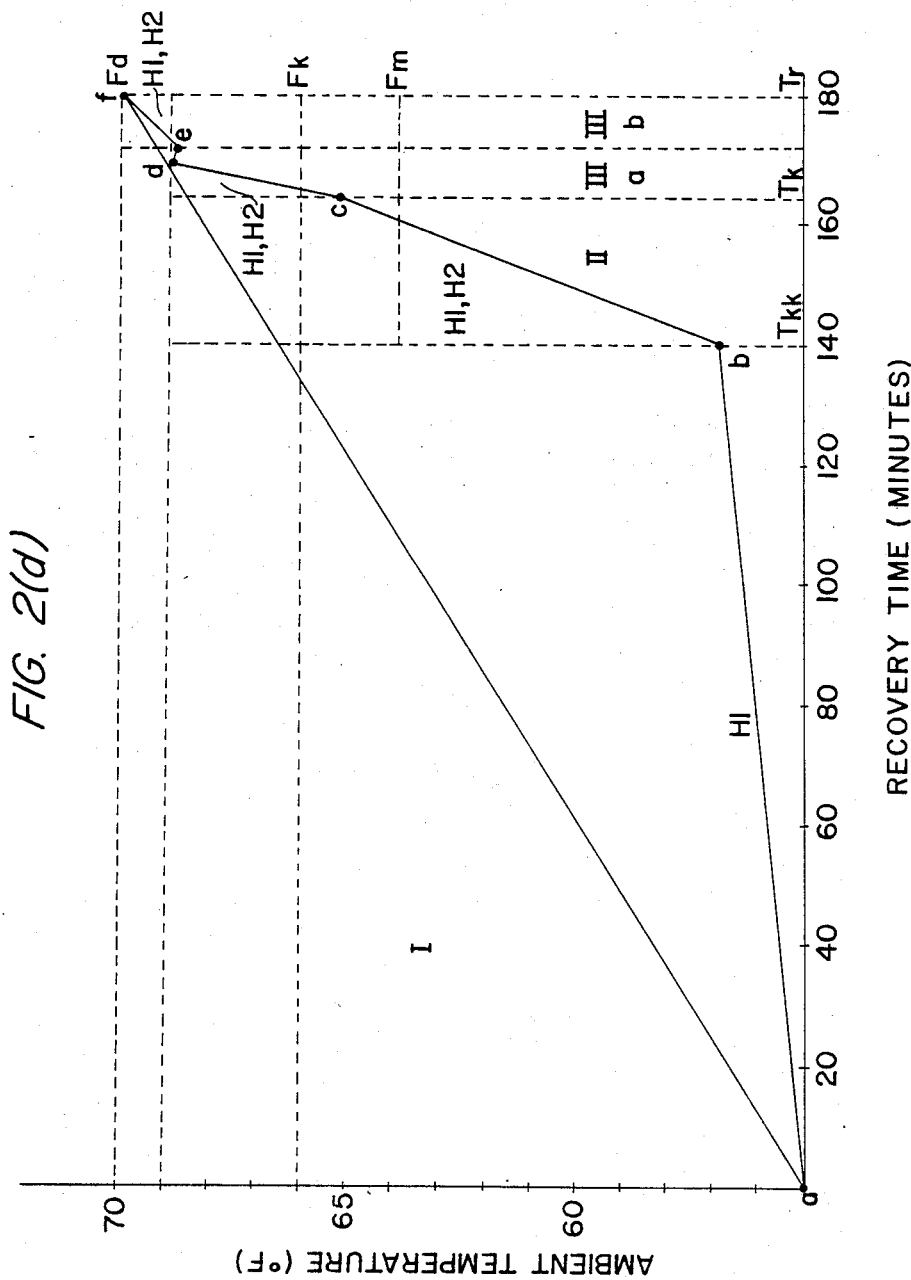

FIG. 2c illustrates an auto recovery operation in which an ambient temperature rise less than 0° is greater in zone I. Recovery is initiated at point a with only compressor heat H1 switched on. The ambient temperature, however, drops despite the operation of the compressor heat. Thus, at point b, after a 1° temperature drop, both compressor heat H1 and auxiliary heat H2 are operated. Both heat sources remain switched until point c when a temperature rise greater than 2°, i.e., 3°, has been generated. At point c, auxiliary heat H2 is switched off while compressor heat H1 remains switched on. However, the compressor heat does not prevent a drop in the ambient temperature and the auxiliary heat must be switched on again at point d. This cycling continues for the remainder of zone I, the auxiliary heat being switched on at points d and f and switched off at point c. At point g, zone II switching is initiated with both compressor heat H1 and auxiliary heat H2 switched on since the ambient temperature f at point g is less than $F_m$. Both heat sources H1 and H2 are operated until the end of zone II at point h. At point h, since the ambient temperature is less than $F_k$, both heat sources H1 and H2 are operated. This operation is continued until the end of the recovery period at point i.

Figure 3:
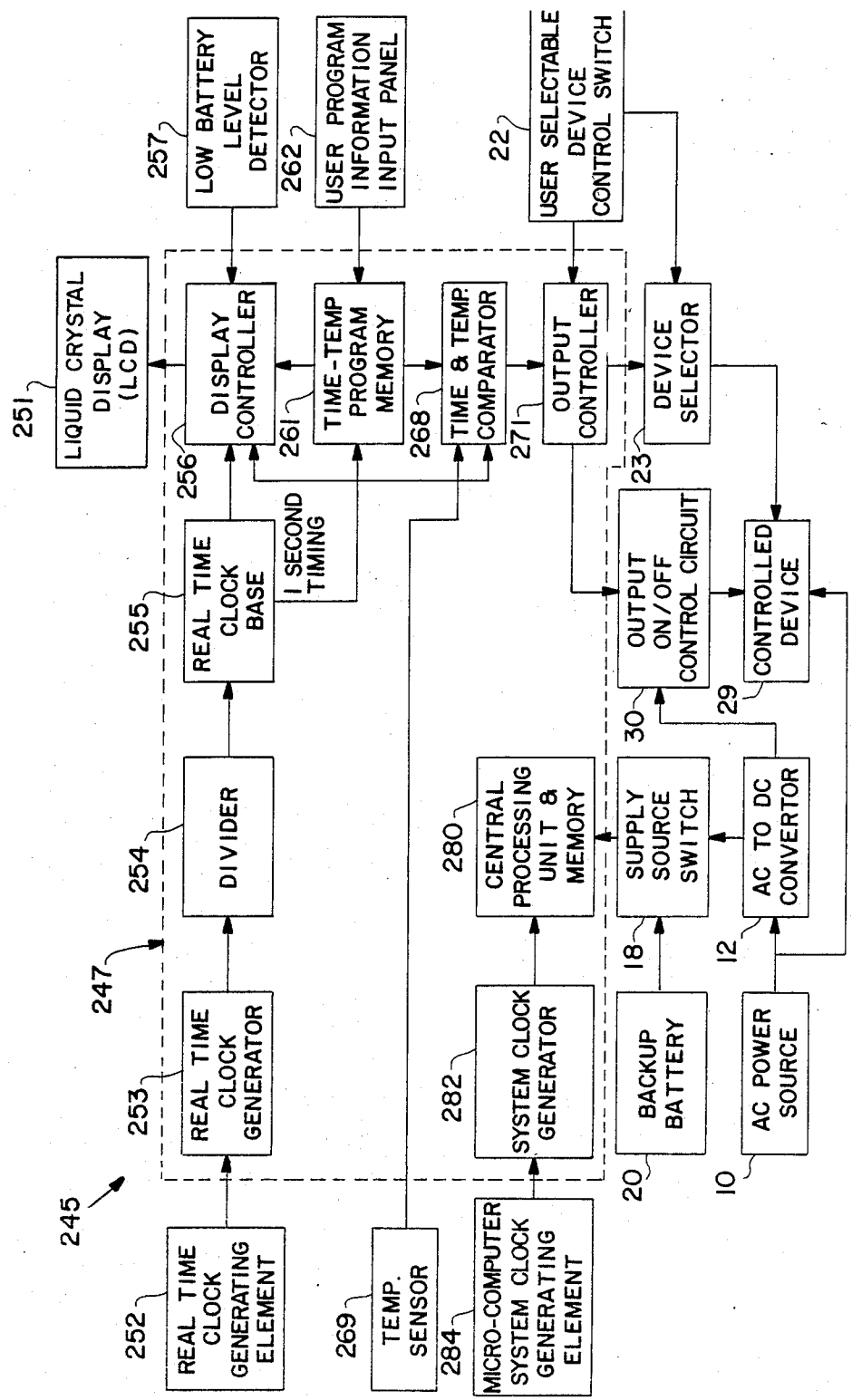
FIG. 3 is a hardware diagram of a thermostat to which the present invention may be applied.

A hardware diagram of a thermostat for use with the present invention appears in FIG. 3. Thermostat 245 includes a single chip microcomputer 247 having a read only memory (ROM) for software and a random access memory (RAM) for data storage. The component blocks bounded by the broken lines are contained within microcomputer 247. Thermostat 245 includes a real time clock generator 253 which generates a real time timing signal in the presence of real time clock generating elements 252. The timing signal generated by clock generator 253 is divided repeatedly by divider 254 to generate a one-second timing signal for real time clock base 255. The real time clock tracking of clock base 255 is necessary for the programming (software) features of the thermostat. Real time clock base 255 also provides a signal to display controller 256 which generates the time of day display for LCD 251. Low battery level detector 257 determines when new batteries are needed for the thermostat and provides a signal to display controller 256 to illuminate or flash a low battery prompt on LCD 251.

Component block 262 is a program control data input which is preferably keys on programmable thermostat 245. The program data input to thermostat 245 via these keys is stored in memory 261. Each second, microcomputer 247 compares the program times stored in memory 261 and the real time to determine wheather a new cooling or heating setpoint temperature is required. When the real time matches a program time, the program temperature corresponding to that program time become the reference temperature against which the ambient room temperature sensed by temperature sensor 269 is compared by comparator 268 to determine the operating states of the heating/cooling system. Once the particular on/off criteria for the heating/cooling system is reached, an on/off switching signal is sent to output controller 271 to switch controller device 29 via out on/off control circuit 30. Controller device 29 may be a heat pump system which includes two compressors for both heating and cooling control, an auxiliary heating system for maximum heating purposes, an auxiliary cooling system for maximum cooling purpose a heat pumping direction control, and a fan for ventilation.

Microcomputer 247 includes central processing unit (CPU) 280. System clock generator 282 generates a system clock signal for CPU 280 in the presence of system clock generating element 284. A.C. power source 10 supplies power to controlled device 29. A.C. power source 10 is couple through AC to DC converter 12 to output on/off control circuit 14 to supply power thereto. AC to DC converter 12 also supplies power to CPU 280 through supply source switch 18. Supply source switch 18 may also be switched to supply power to CPU 280 from back-up battery 20. User device control switch 22 is couple to device selector 23 and permits a user to select a controller device.

Again, since the heat pump system heats or cools the room at a relatively slow rate (to minimize energy consumption), it is necessary to preheat or precool the room before the program time is reached. The microcomputer calculates, according to an empirical formula, the auto recovery start time prior to the next program time, and tries to heat up or cool the room in the manner described above so the user can enjoy a comfortable room temperature when he awakes or arrives home.

Figure 4:
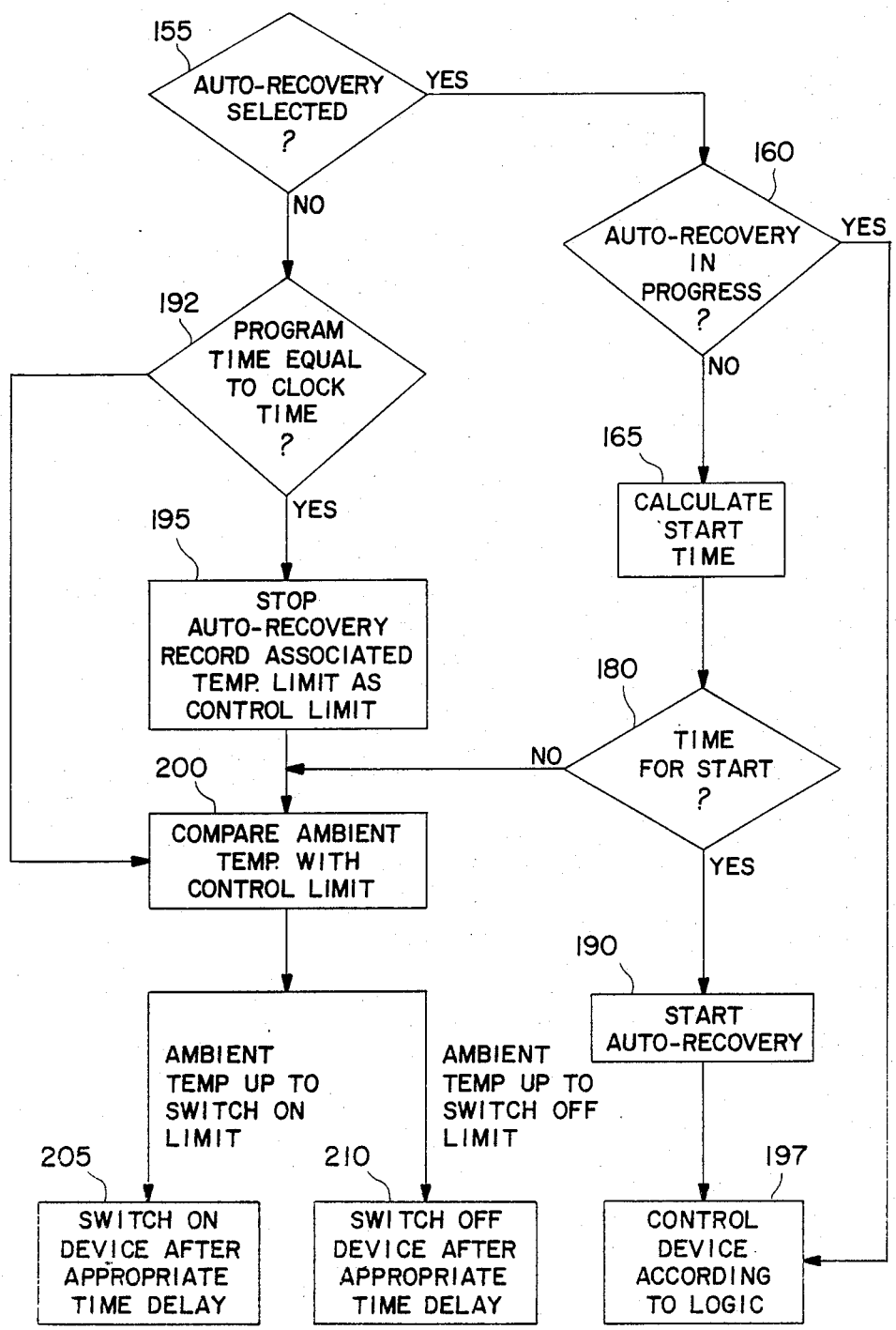
FIG. 4 is a flow chart showing the operation of the thermostat of FIG. 4.

The thermostat operation will be explained with reference to the flow chart of FIG. 4. A determination is made at step 155 as to wheather the user has selected the auto-recovery mode. If so, control passes to step 160 where a determination is made as to whether auto recovery is in progress. If auto-recovery is not in progress, the start time for recovery is calculated at step 165 according to an empirical formula as described above and a determination is made at step 180 wheather it is time for recovery to start. If it is time for auto recovery to be initiated, control passes to step 190 where auto-recovery is initiated. Auto-recovery is controlled according to the various switching logics described above at step 197. If at step 180, it is determined that it is not time for auto recovery to start, control passes to step 200.

If the user has not selected the auto recovery mode at step 155, a determination is made at step 192 wheather the program time is equal to the real clock time. If not, control passes to step 200. If so, auto recovery is stopped and the program temperatures corresponding to that clock time become the new control temperatures at step 195. Control then subsequently passes to step 200.

At step 200, the ambient temoerature is comapred with the control limit temperatures. If the ambient temperature is such that the heating or cooling devices should be switched on, the appropriate device is switched on at step 205 after a predetermined time delay. If the ambient temperature is such that the heating or cooling device should be switched off, the appropriate device is switched off at step 210 after a predetermined time delay. The control limit temperatures may be the control temperatures themselves or may be fixed by a span associated with the control temperature. For example, the heating system may be switched on 1° below the control temperature and switched off 2° above the control temperature.

The temperature recovery system described in detail above has important energy efficiency characteristics associated therewith. In many prior art auto recovery techniques, the first cycle, or zone as it were, of auto recovery is a so-called sampling cycle. For example, the compressor heat is activated for a predetermined period of time, e.g., 15 minutes. During this predetermined time period, the rate of temperature increase is calculated in accordance with the temperature in the predetermined period. Based on this calculated rate, the microprocessor controlling the auto recovery cycle determines wheather auxiliary heat will be operated during the reminder of the auto recovery cycle.

Figure 5:
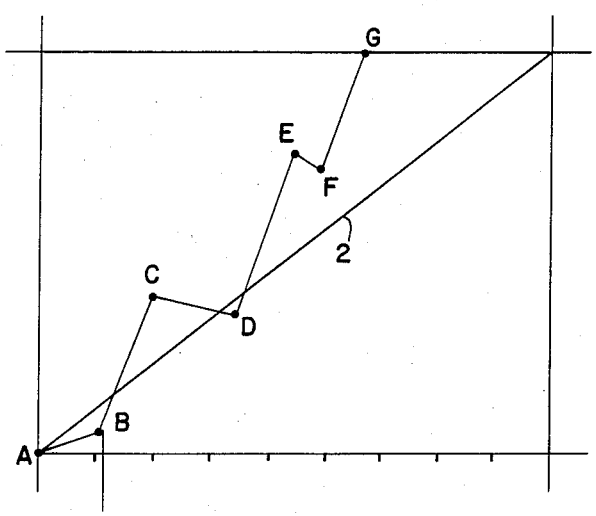
FIG. 5 is an illustration of recovery according to a prior art technique.

The effects of this prior art technique are illustrated in FIG. 5. The interval from A to B heat represents a sampling cycle during which only compressor heat is operated. Since the rate of temperature increase during this sampling cycle is less than the calculated recovery ramp 2, the microprocessor controlling unto recovery determines that auxiliary heat will be utilized during the reminder of the recovery cycle. Since a large amount of time remains in the recovery peroid, needless auxiliary heat will be utilized to complete recovery, resulting in an energy inefficient recovery operation. It is also possible that the desired temperature $F_d$ will be reached significantly before the end of the recovery period because of excessive heating caused by the use of auxiliary heat. It is als possible that if weather conditions change suddenly and the outdoor temperature increases significantly, the microprocessor decision to utilize auxiliary heat based on the temperature rise during the sampling cycle will not result in energy efficient recovery since the change in weather conditions obviates the need for the use of auxiliary heat. On the other hand, if the microprocessor decision had been not to utilize auxiliary heat, a sudden drop in the outdoor temperature may result in the ambient temperature not being raised to the desired temperature by the desired time. This incomplete recovery can simply result in the excessive use of auxiliary heat immediately after the recovery operation ends in order to generate the desired comfort temperature.

In the present invention described above, there is no sampling cycle. The switching logic of auto recovery is based simply on the absolute rise and fall of temperature. There is no predetermined time period to calculate the rate of increase or decrease of the ambient temperature of the controlled region or space. The decision wheather to utilize auxiliary haet is made only during later phases of the recovery operation. Auxiliary heat is switched on earlier only when it is determined that the ambient temperature has fallen below the temperature when auto recovery was initiated. In addition, the present invention includes boundary conditions which regulate the temperature increase (or temperature decrease in a cooling mode) during recovery. Thus, as recovery proceeds, the temperature increase within each zone is strictly controlled. Thus, a smooth temperature increase is generated, with minimum use of auxiliary heat. Finally, sudden changes in weather conditions do not affect the recovery operation because the desicion wheather to use auxiliary heat is not made during a sampling cycle. The desicion to utilize auxiliary heat is made only in the last few zones or subzones prior to the end of auto recovery. Even in these later zones, the ambient temperature is raised in such a manner that the uilization of auxiliary heat is regulated by logical desicions which prevent excssive use auxiliary heat, e.g., boundary conditions. The division of the recovery period into a plurality of zones and subzones and the regulation of auxiliary heat use as described above by the various logical sequence and boundary conditions optimizes recovery so as to generate energy savings.

Figure 6:
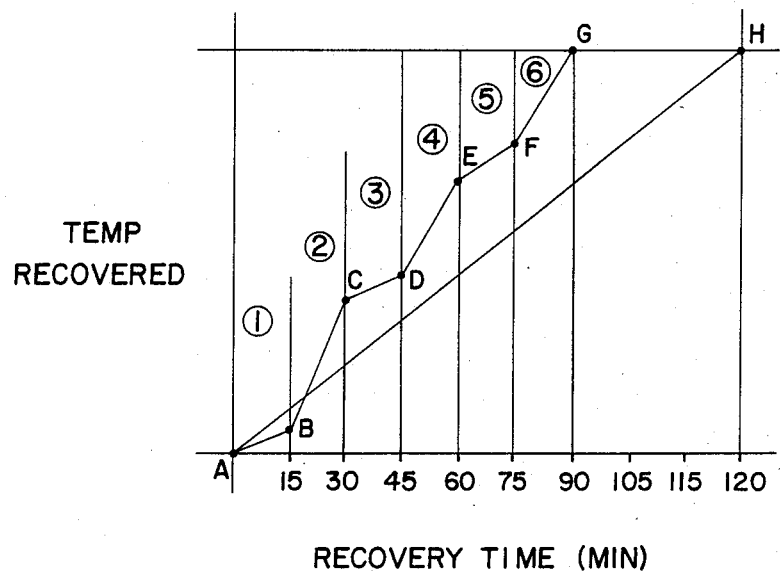
FIG. 6 is an illustration of recovery according to another prior art technique.

Other prior art recovery techniques repeatedly sample the rate of temperature increase and decrease at predetermined time intervals during auto recovery. The microprocessor determines whether to utilize auxiliary heat based on the characteristics of the previous cycle. However, technique may also result in inefficient recovery as well explained with reference to FIG. 6. Based on a first cycle having a fixed, predetermined time period donated by line segment AB, the microcomputer determines wheather to utilize auxiliary heat during a second cycle having a fixed, pretermined time peroid. Since the temperature increase during the first cycle suggests that full recovery will not be effected by the end of the recovery peroid, auxiliary heat is utilized during the second cycle. However, the use of auxiliary heat is utilized during the second cycle. ambient temperature so quickly that the microprocessor determines auxiliary heat will not be utilized during the third cycle, the third cycle denoted by line segment CD. The quick temperature rise may be due to the capacity of the heating system or due to changes in weather conditions. According to this technique, auxiliary heat is used in the early stages (second cycle) of recovery. Thus, since no boundary conditions have been imposed, auxiliary heat may have been used needlessly. Since the temperature increase during the second cycle was faster than that needed to effect full recovery, the microprocessor determines that auxiliary heat is not necessary during the third cycle. However, during the third cycle, the microprocessor determines that compressor heat alone will not effect full recovery by the desired time, and thus during the fourth time period the auxiliary heat is used again. Similar cycles may occur throughout the recovery peroid. The net result of such cycling is that the recovery temperature is attained too quickly due to the needless use of auxiliary heat in the early recovery stages. This is a very expensive temperature recovery method.

Figure 7:
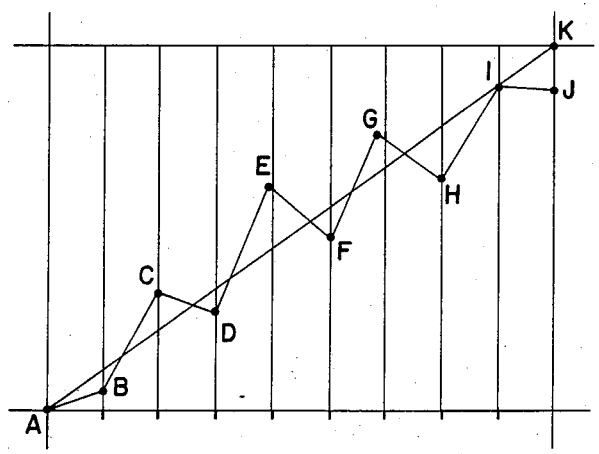
FIG. 7 is an illustration of recovery according to still another prior art technique.

Finally, still other prior art recovery techniques strictly control the utilization of various heat sources to restrict the rise along the shortest temperature recovery ramp as represented by the line segment AK in FIG. 7. Again, as described above with respect to FIG. 6, auxiliary heat may be used inefficiently during the early stages and in subsequent alternate cycles in order to follow the ramp. In general, most of the prior art methods performed adequatley in good weather conditions but are not economical in poor weather conditions where outside temperature conditions fluctuate widely.

The invention has been described in detail in connection with the preferred embodiments. These embodiments, however, are merely for example only and the invention is not limited thereto. It will be easily understood by those skilled in the art that other variations and modifications can easily be made within the scope of this invention as defined by the appended claims.

I claim;

1. A method of controlling an air conditioning system which comparises the steps of:
   calculating a recovery time peroid for said air conditioning system to bring the ambient temperature of the air within a predetermined volume of space from a first current temperature level to a second desire temperature level, said recovery time period being calculated as a function of the difference between the first current temperature level and the second desired temperature level;
   continuously monitoring the ambient temperature of the air within said predetermined volume of space; and
   controlling the rate at which said air conditioning system brings the ambient temperature to the desired temperature level during said recovery time period by providing said system with a switching logic which regulates the on/off switching of said air conditioning system in response to the amount of rise and fall of the ambient temperature and prevents said system from bringing the air within the predetermined volume of space to the desired temperature level until substantially the end of the recovery time peroid.

2. A method according to claim 1 which further comprises the steps of:
   dividing said recovery time period into a plurality of switching zones; and
   developing a switching logic for each of said switching zones to regulate the on/off switching of said air conditioning system within each switching zone in response to the amount of rise and fall of the ambient temperature within each of said switching zones.

3. A method according to claim 2 which further includes the step of providing each switching zone with an associated temperature so that the switching logic regulates the on/off switching of said air conditioning system in response to the amount of rise and fall of the ambient temperature within said associated temperature limit.

4. A method according to claim 2 which further comprises the steps of :
   dividing each of said switching zones into one or more subzones; and
   providing each of said subzones with an associated temperature limit to regulate the on/off switching of the air conditioning system within said subzone in response to the amount of rise and fall of the ambient temperature within said associated limit to further reduce the amount of energy utilized by said air conditioning system during said recovery time period.

5. A method of controlling a muli-stage air conditioning system having an energy efficient first stage and at least one less energy efficient second stage, said method comprising the steps of:
   calculating a recovery time period for said multi-stage air conditioning system to bring the ambient temperature of a predetermined volume of space from a first current temperature level to a second desired temperature level, said recovery time period being calculated as a function of the difference between the first current temperature level and the second desired temperature level;
   continuously monitoring the ambient temperature within said predetermined volum of space;
   dividing said calculated recovery time period into a plurality of switching zones;
   providing each of said switching zones with an associated temperature limit; and
   controlling the rate at which said air conditioning system brings the ambient temperature from the first current level to the second desired level within said recovery time period by providing said system with a switching logic which regulates the on/off switching of said first and second stages of the air conditioning system in response to the amount of rise and fall of the ambient temperature within said associated temperature limits.

6. A recovery system for use in an air conditioning system to bring the ambient temperature of the air within a predetermined volume of space from a first current temperature level to a second desired temperature level, said recovery system comprising:
   a thermostat;
   means for calculating a recovery time period during which said air conditioning system brings the ambient temperature of the predetermined volume of space from said first temperature level to said second temperature level, said recovery time period being calculated as a function of the difference between the first current temperature level and the second desired temperature level;
   means for continuously monitoring the current ambient temperature within said predetermined volume of space; and
   means for controlling the rate at which said air conditioning system brings the ambient temperature to the desired temperature level during said recovery time period by regulating the on/off switching of the air conditioning system in response to the amount of rise and fall of the ambient temperature.

7. A recovery system according to claim 6 which further comprises:
   means for dividing and recovery time period into a plurality of switching zones; and
   means for providing each of said switching zones with an associated temperature limit.

8. A recovery system according to claim 7 which further comprises logic means within each of said plurality of switching zones to regulate the on/off switching of the air conditioning system in response to the amount of rise and fall of the ambient temperature within said associated temperature limits so that recovery system utilizes substantially all of the recovery time period to bring the ambient temperature to the desired temperature level.

9. An air conditioning system for controlling the ambient temperature of the air within a predetermined volume of space, said air conditioning system comprising:
- an energy efficient first stage for modifying the ambient temperature in a predetermined volume of space;
- at least one second stage for modifying the ambient temperature in a predetermined volume of space, said at least one second stage being less energy efficient than said first stage;
- thermostat means for controlling said first and second stages;
- means for calculating a recovery time period during which said air conditioning system brings the ambient temperature of the predetermined volume of space from said first temperature level to said second temperature level, said recovery time period being calculated as a function of the difference between the first current temperature level and the second desired temperature level;
- means for continuously monitoring the current ambient temperature within said predetermined volume of space; and
- means for controlling the rate at which said air conditioning system brings the ambient temperature to the desired temperature level within said recovery time period by regulating the on/off switching of the air conditioning system in response to the amount of rise and fall of the ambient temperature.

10. An air conditioning system according to claim 9 which further comprises:
- means for dividing said recovery time period into a plurality of switching zones; and
- means for providing each of said switching zones with an associated temperature limit.

11. An air conditioning system according to claim 10 which further comprises logic means within each of said plurality of switching zones to regulate the on/off switching of the air conditioning system in response to the amount of rise and fall of the ambient temperature within said associated temperature limits.

* * * * *

UNITED STATES PATENT AND TRADEMARK OFFICE
CERTIFICATE OF CORRECTION

PATENT NO. : 4,911,358

DATED : March 27, 1990

INVENTOR(S) : Vinay Mehta

It is certified that error appears in the above-identified patent and that said Letters Patent is hereby corrected as shown below:

Col. 2, line 50, "recvoery" should be --recovery--;

Col. 2, line 62, after the word "single" please insert the word --stage--;

Col. 3, line 64, "peroid" should be --period--;

Col. 3, line 44, after the word "zone" please insert the number --3--;

Col. 3, line 64, "merly" should be --merely--;

Col. 4, line 15, after the word "zone" please insert --I and zone--;

Col. 4, line 32, after the number/degree "4°" please insert the word --rise--;

Col. 4, line 66, after the word "continues" please insert --as indicated--;

Col. 5, line 14, "of" should be --f--;

Col. 5, line 60, "rise" should be --rises--;

Col. 6, line 1, "raise" should be --raises--;

Col. 6, line 43, "teaching" should be --teachings--;

Col. 7, line 28, after "due to" please delete --due to--;

Col. 7, line 35, "calcuation" should be --calculate--;

Col. 7, line 39, "greater" should be --generated--;

UNITED STATES PATENT AND TRADEMARK OFFICE
CERTIFICATE OF CORRECTION

PATENT NO. : 4,911,358
DATED : March 27, 1990
INVENTOR(S) : Vinay Mehta

It is certified that error appears in the above-identified patent and that said Letters Patent is hereby corrected as shown below:

Col. 8, line 35, "purpose" should be --purposes--;

Col. 9, line 48, "unto" should be --auto--;

Col. 9, line 57, "als" should be --also--;

Col. 10, line 50, delete "is utilized during" please insert --in--;

Col. 10, line 50, after the word "cycle" please insert --may raise the--;

Col. 11, line 30, "desire" should be --desired--;

Col. 11, line 60, after the word "temperature" please insert --limit--;

UNITED STATES PATENT AND TRADEMARK OFFICE
CERTIFICATE OF CORRECTION

PATENT NO. : 4,911,358

DATED : March 27, 1990

INVENTOR(S) : Vinay Mehta

It is certified that error appears in the above-identified patent and that said Letters Patent is hereby corrected as shown below:

Col. 11, line 65, "2" should be --3--;

Col. 12, line 5, after the word "associated" please insert --temperature--;

Col. 12, line 22, "volum" should be --volume--; and

Col. 13, line 8 "comparis" should be --compris--.

Signed and Sealed this

Fourth Day of August, 1992

Attest:

DOUGLAS B. COMER

Attesting Officer     Acting Commissioner of Patents and Trademarks